United States Patent Office

3,801,632
Patented Apr. 2, 1974

3,801,632
PROCESS FOR THE CONTINUOUS PRODUCTION OF THE DISODIUM SALTS OF m-BENZENEDISULFONIC ACID
Rudolf Lademann, Frankfurt am Main, Karl Weisenberger, Schonberg, Taunus, and Adolf Metzger, Wiesbaden, Germany, assignors to Farbwerke Hoechst Aktiengesellschaft vormals Meister Lucius & Bruning, Frankfurt am Main, Germany
No Drawing. Continuation of abandoned application Ser. No. 9,393, Feb. 6, 1970. This application Dec. 27, 1971, Ser. No. 212,713
Claims priority, application Germany, Feb. 8, 1969, P 19 06 399.1
Int. Cl. C07c 143/24
U.S. Cl. 260—505 N                    1 Claim

ABSTRACT OF THE DISCLOSURE

For the manufacture of the disodium salts of m-benzenedisulfonic acid, the acid is neutralized in a stirred bed of solid substance. As such stirred bed of solid substance there is used the salt which has been formed by neutralization and is being stirred by a mechanical device, for example, a screw conveyor, paddle screw or stirrer.

---

This application is a continuation application of pending application Ser. No. 9,393 filed Feb. 6, 1970, now abandoned.

The present invention relates to a process for the continuous production of salts by neutralization of their acids.

It has been proposed to produce salts by neutralization of the free acids in an aqueous solution or suspension or in a solution or suspension in a specific solvent. Depending on the solubility conditions, the salts are isolated by crystallization, followed by filtration and drying or by complete evaporation of the solvent. To prevent the end product from being decomposed or damaged by the heat liberated in the reaction of the known processes it is ofen necessary to add an adequate amount of solvent or diluent. The salts so obtained have a broad grain spectrum with a large proportion of powder and dust.

The present invention provides a process for the continuous production of salts by neutralization of their acids which comprises reacting the reaction components in a mechanically stirred bed of solid substances. The process of the invention enables the above disadvantages of the known processes to be overcome.

As mechanically stirred, and preferably fluidized, bed of solid substances, a neutral product, preferably the end product, which is being stirred by mechanical devices, for example a screw conveyor, paddle screw or stirrer, is used. The reaction components are advantageously added to the stirred bed in a stoichiometric proportion. The amount of salt which has been formed by neutralization is continuously removed from the stirred bed. The heat of reaction liberated in the neutralization is eliminated by evaporation of the water which has been formed. If the amount of water is insufficient, the heat may additionally be eliminated by a secondary cooling cycle. It is also possible to add water to one of the reaction components or to the stirred bed directly. The water evaporates completely, thus consuming the heat liberated in the reaction. The amount of water to be added to the reaction components or to the bed directly, is calculated such that it is completely evaporated in the stirred bed whereby the latter is adjusted to such a temperature that neither the fusing temperature nor the decomposition temperature of the salts is obtained. The amount of neutral product required for the stirred bed substantially depends on the amount of heat which is liberated in the reaction and must consequently be eliminated.

Contrary to the known processes, an additional separation of diluents or their evaporation which involves much expenditure of energy is dispensed with by the process of the invention. Dry salts are obtained in the form of substantially dust-free granular products.

The process in accordance with the invention may be used for the production of all salts, particularly of those which are manufactured in large quantities, for example, phosphates, sulfates, sulfites, halides and carbonates.

The following examples serve to illustrate the invention.

EXAMPLE 1

In a container having a capacity of about 200 liters, about 40 kilograms of the disodium salt of m-benzenedisulfonic acid having a temperature of about 140° C. were fluidized by a screw conveyor. An aqueous sodium hydroxide solution of 70% strength, having a temperature of about 100° C., and molten m-benzenedisulfonic acid of a temperature of about 120° C., were added separately to the fluidized bed of solid substances. The salt obtained by the neutralization was continuously removed from the fluidized bed through an overflow. The heat of reaction was in part eliminated by evaporation of the water that was formed in the course of the reaction and the water that had been introduced with the aqueous sodium hydroxide solution, and in part removed by means of a secondary cooling cycle. By proceeding in this manner, the fluidized bed was kept at a temperature of about 130 to 140° C. About 250 kilograms of dry, finely granulated and substantially dust-free disodium salt were continuously removed per hour from the fluidized bed. When higher temperatures were used undesirable side reactions took place, while a moist salt was obtained at lower temperatures.

EXAMPLE 2

Soda was prepared from sodium hydroxide solution and carbon dioxide in a rotary mixer. A revolving mechanically stirred bed was obtained in the two troughs of the rotary mixer with the help of opposed paddle screws and overflows. To start the experiment, dry soda was placed in the rotary mixer and the bed was heated through the jacket of the rotary mixer. When a product temperature of 120 to 140° C. had been reached, a 50% sodium hydroxide solution was introduced at the beginning of one of the troughs through a distributing device which was a perforated tube in one instance and a slot die nozzle in another instance. The carbon dioxide necessary for the reaction was introduced in an excess amount of 10 to 20% at the end of the same trough through a fine perforated plate at the bottom of the mixer. A partial stream of about 10% of the carbon dioxide was introduced at the top of the second trough. During the working of the rotary mixer the amount of soda ash which had been formed was removed shortly before the inlet for the sodium hydroxide solution. By proceeding in this manner, 25 to 30 kilograms per hour of soda were obtained per square meter of heating surface and at a difference in temperature of about 80° C. The yield per square meter could be increased by adding a hot 70% sodium hydroxide solution.

What is claimed is:

1. A process which comprises maintaining a bed of disodium salt of m-benzenedisulfonic acid in a solid, fluidized condition by mechanical stirring and at a temperature of about 130 to 140° C., continuously and separately adding to said bed an aqueous sodium hydroxide solution and molten m-benzenedisulfonic acid, and continuously removing dry, finely granulated and substantially dust-free disodium salt of m-benzenedisulfonic acid from said bed.

References Cited

UNITED STATES PATENTS

| | | | |
|---|---|---|---|
| 2,909,534 | 1/1959 | Stratford | 260—505 N |
| 2,671,797 | 3/1964 | Hagemann et al. | 260—505 N |
| 2,607,801 | 8/1952 | Milner et al. | 260—505 N |
| 2,690,446 | 10/1954 | Ledgett | 260—505 N |
| 1,435,928 | 11/1922 | Kipper | 23—1 C |
| 3,492,083 | 1/1970 | Lowicki et al. | |
| 1,962,185 | 6/1934 | Fauser | 23—50 R |
| 2,600,253 | 6/1952 | Lutz. | |
| 2,738,255 | 3/1956 | Sullivan et al. | 23—59 |

FOREIGN PATENTS 1,109,617  4/1968  Great Britain.

HERBERT T. CARTER, Primary Examiner

U.S. Cl. X.R.

423—304, 309, 421, 419, 544, 512, 659